US006724485B1

(12) United States Patent
Drabarek

(10) Patent No.: US 6,724,485 B1
(45) Date of Patent: *Apr. 20, 2004

(54) INTERFEROMETRIC MEASURING DEVICE FOR DETERMINING THE PROFILE OR THE PITCH OF ESPECIALLY ROUGH SURFACES

(75) Inventor: Pawel Drabarek, Tiefenbronn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/622,802

(22) PCT Filed: Feb. 16, 1999

(86) PCT No.: PCT/DE99/00433

§ 371 (c)(1),
(2), (4) Date: Oct. 11, 2000

(87) PCT Pub. No.: WO99/44009

PCT Pub. Date: Sep. 2, 1999

(30) Foreign Application Priority Data

Feb. 27, 1998 (DE) .......................... 198 08 273

(51) Int. Cl.⁷ ................................................ G01B 9/02
(52) U.S. Cl. ...................................................... 356/485
(58) Field of Search ..................... 356/485, 489, 356/484, 477, 482, 479, 447

(56) References Cited

U.S. PATENT DOCUMENTS

| 5,061,071 A | * 10/1991 | Fujita et al. |
| 5,106,192 A | * 4/1992 | Tucker et al. |
| 5,555,087 A | * 9/1996 | Miyagawa et al. |
| 6,490,046 B1 | * 12/2002 | Drabarek et al. ........... 356/489 |

FOREIGN PATENT DOCUMENTS

| DE | 39 06 118 | 8/1990 |
| DE | 44 04 663 | 8/1995 |
| EP | 0 126 475 | 3/1989 |
| WO | 92 10719 | 6/1992 |

* cited by examiner

Primary Examiner—Samuel A. Turner
Assistant Examiner—Michael A. Lyons
(74) Attorney, Agent, or Firm—Kenyon & Kenyon

(57) ABSTRACT

An interferometric measuring device for detecting the shape of rough surfaces includes a spatially coherent beam gun unit that emits a short time coherent and broad-band beam. The device is separated into a section containing the components of a modulation interferometer and the components of a measuring probe. The measuring probe is coupled to the modulation interferometer via an optical fiber arrangement, and used remotely from the modulation interferometer.

11 Claims, 1 Drawing Sheet

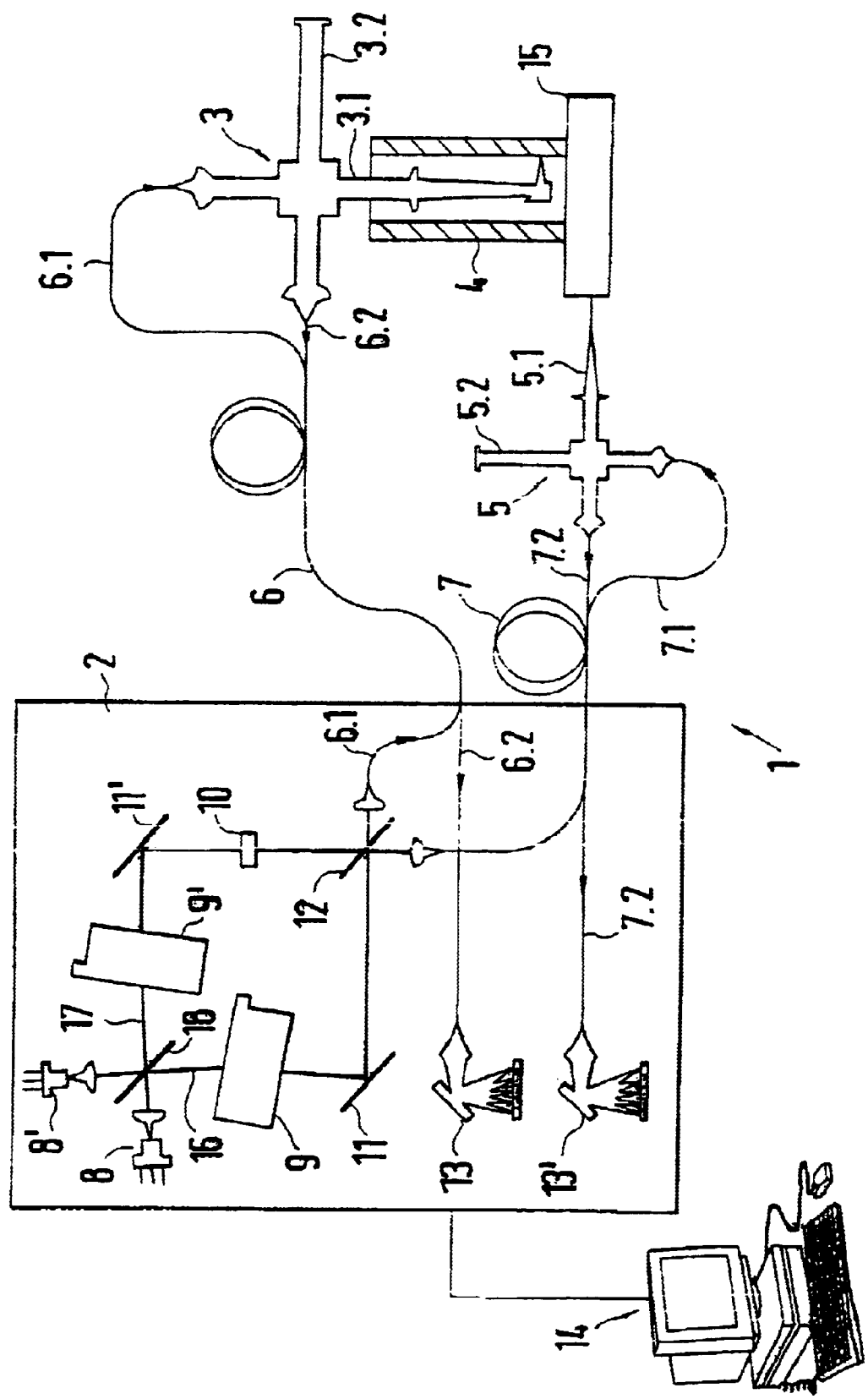

INTERFEROMETRIC MEASURING DEVICE FOR DETERMINING THE PROFILE OR THE PITCH OF ESPECIALLY ROUGH SURFACES

FIELD OF THE INVENTION

The present invention relates to an interferometric measuring device for detecting the shape or distance, in particular of rough surfaces. The interferometric measuring device has at least one spatially coherent beam gun unit, whose beam in a measuring probe is divided into a reference measuring beam guided through and reflected in a measuring reference arm and a measuring beam guided through a measuring arm and reflected on the rough surface; a device for modulating the light phase or for shifting the light frequency (heterodyne frequency) of a first partial beam with respect to the light phase or the light frequency of a second partial beam using a superposition unit for superimposing the reflected measuring beam on the reflected measuring reference beam; a beam splitting unit and receiving unit for splitting the superimposed beam into at least two beams having different wavelengths and converting the beams into electrical signals; and an analyzer, in which the shape or distance of the rough surface can be determined on the basis of a phase difference of the electrical signals.

BACKGROUND INFORMATION

Such an interferometric measuring device is referred to in European Patent No. 126 475. In this measuring device, rough surfaces of a measured object are measured interferometrically. A beam gun unit that has laser light sources, which emit light of different wavelengths, is used. The laser light is divided into a reference beam of a reference beam path and a measuring beam of a measuring beam path using a beam splitter. The measuring beam path impinges on the surface to be measured, while the reference beam path is reflected on a reference surface, for example in the form of a mirror. The light reflected from the surface and the reference surface is combined in the beam splitter and focused, with the help of a lens, in a interferogram plane, where a speckle pattern is obtained. This speckle pattern is analyzed to determine the surface shape, a phase difference of the interferogram phases in the measuring point being determined. In order to simplify the analysis, a heterodyne process is used. The frequency of the reference beam is shifted with respect to the frequency of the measuring beam by a heterodyne frequency using a frequency shifter in the reference beam path. With this measuring device, a fine resolution of the surface shapes can be obtained. The laser light that has different discrete wavelengths can be generated using individual laser light sources such as an argon laser. Such laser light sources are relatively expensive. Semiconductor lasers with a plurality of different discrete wavelengths (modes), on the other hand, are unsuitable for such interferometric measurements due to their insufficient stability and the resulting wavelength shift. As an alternative, a plurality of laser light sources such as laser diodes can be used in order to generate the different discrete wavelengths. It is technically difficult to generate the spatial coherence of the beam composed of the different wavelengths. In addition, in such laser diodes the instability of the individual discrete wavelengths is particularly unfavorable. Providing a plurality of different discrete wavelengths is therefore also costly.

In using laser light for generating the discrete wavelengths it is also difficult to accurately set the desired distance between the measuring probe and the surface (autofocus function). The design using the laser light source also makes it difficult to design the measuring part as an easy-to-handle unit which can be used, for example, instead of a mechanical probe of a measuring machine.

Another interferometric measuring device is described in German Patent Application No. 39 06 118, in which optical fibers are provided between a plurality of laser light sources and a measuring section. Here too, a phase difference is evaluated for determining the surface structures. This measuring device is also disadvantageous with regard to handling in places that are difficult to access.

SUMMARY OF THE INVENTION

An object of an exemplary embodiment of the present invention is to provide a heterodyne or phase interferometric measuring device, with which very accurate measurements of surface shapes and surface distances are possible under industrial conditions even on relatively difficult-to-access surfaces such as small boreholes, and which is easy to handle and has a simple design.

The object is achieved with the exemplary embodiment of the present invention, according to which the beam emitted by the beam gun unit is broad-band and has a short coherence time.

Surprisingly, the broad-band, short coherence time beam gun units that have a higher spatial coherence than light sources of a heterodyne interferometric measuring unit, in particular in conjunction with the measurements of rough surfaces, are not only well-suited, but also offer considerable advantages compared to laser light sources. The spatial coherence of the beam naturally results from the light source. Instabilities of the spectral beam distribution of the light source have virtually no effect on the measurements, since not only are individual fixed wavelengths always selected using the beam gun unit (e.g. grating) and the assigned beam receiving unit from the continuous spectrum in a stable manner, but, in particular, also their difference, which is important for accurate and unambiguous evaluation, is preserved in a stable manner. Changes in the intensity of the wavelengths in the case of instabilities have no effect due to the heterodyne technology, since in this case only the phases are relevant. The short time coherence beam allows an autofocus function to be implemented in a very simple manner, since the heterodyne signal is present only for a certain distance range determined by the short coherence length between the measuring part and the surface. Furthermore the short coherence length offers the advantage that, using coherence multiplexing, the entire measuring system can be divided into a modulation interferometer containing the active components and a small, sturdy, and easy-to-handle measuring part designed as a measuring probe, separated spatially therefrom by optical fibers, for example.

An exemplary embodiment of the present invention also includes an embodiment that is advantageous for use in manufacturing. In the Mach-Zehnder embodiment, the difference of angular dispersion is minimized due to the two acoustical-optical modulators arranged in the two partial beam paths.

If the beam gun unit has a short coherent, broad-band additional light source, which can be operated for light amplification or as a backup light source, the light intensity can be enhanced by using both light sources. As an alternative, the additional light source can be used as a backup light source in case of failure of the other light source.

The measures of an additional device for frequency shifting is arranged in the beam path of the second partial beam for frequency shifting the first partial beam with respect to the second partial beam, and the device and the additional device for frequency shifting are acoustical-optical modulators are suitable for achieving a low angular dispersion. The arrangement of modulators in the two beam paths reduces measurement errors due to temperature drifts and the related change in the refractive index of an acoustical-optical modulator, which would result in undesirable phase shifts.

Furthermore, the fact that the beam splitting and receiving. unit is a spectral device that has a downstream photo-detector matrix and the beam splitting and receiving unit also mounted in the unit and is coupled to the measuring probe via the optical fiber arrangement, is favorable for the design and for evaluation.

Design and evaluation are further facilitated by the fact that the measuring probe, including the measuring arm, the measuring reference arm, and a beam splitter of the measuring probe, is designed as a Michelson or Mirau interferometer and that an optical path difference produced in the measuring arm and in the measuring reference arm compensates for the optical path difference produced by the time delay element.

An additional beam path is formed starting from the second beam splitter, leading to a reference probe that has a reference probe reference arm and a reference probe measuring arm. An additional beam splitting and receiving unit is provided in the unit, and the unit is coupled to the reference probe via an additional optical fiber arrangement, so that an error of the rotating table used for moving the measuring object having the surface structure to be measured can be compensated. Furthermore the reference probe can be used for compensating a drift of the modulation interferometer provided in the unit, caused, for example, by temperature.

BRIEF DESCRIPTION OF THE DRAWING

The FIGURE schematically shows an arrangement of components of an interferometric measuring unit for detecting the shape of rough surfaces.

DETAILED DESCRIPTION

The interferometric measuring arrangement is divided into two sections, one of which is designed as unit 2 in the form of a modulation interferometer, while the other section includes a measuring probe 3 with which a measured object 4 that has a rough surface to be measured is placed on a rotating table 15 and is scanned, as well as a reference probe 5. Measuring probe 3 is coupled to modulation interferometer 2 via an optical fiber arrangement 6, while measuring probe 5 is connected to modulation interferometer 2 via another optical fiber arrangement 7. Modulation interferometer 2 in the form of unit 2 is designed in this example as a Mach-Zehnder interferometer and has a light source 8, and an additional light source 8', acoustical-optical modulators 9 and 9' arranged in the beam paths of a first partial beam 16 and a second partial beam 17, respectively, and two photo-detector matrices, which are part of a beam splitting and receiving unit 13 and an additional beam splitting and receiving unit 13' as active components. A design as a Michelson interferometer may be used. Modulation interferometer 2 is built into an air-conditioned, vibration-insulated housing, for example.

Light source 8 and additional light source 8', for example, superluminescent diodes, are shorttime coherent, broadband light sources that have a continuous spectral distribution of a plurality of different wavelengths. The light of light source 8 and the light of light source 8' are collimated and split into first partial beam 16 and second partial beam 17 by a first beam splitter is, with light source 8 and additional light source 8' being located on different sides of beam splitter 18. Additional light source 8' can be used as a pre-adjusted backup source or for amplifying the overall light intensity. Roth partial beams 16, 17 are frequency shifted with respect to one another by the two acoustical-optical modulators 9 and 9'. The frequency difference is a few kHz, for example. In one arm of modulation interferometer 2 designed, for example as a Mach-Zehnder interferometer or a Michelson interferometer, a time delay element 10 is used, for example, in the form of a plane parallel glass plate, in the beam path downstream from acoustical-optical modulator 9' and a deflecting mirror 11'; this glass plate produces a difference of the optical path lengths of the two partial beams 16, 17 that is longer than the coherence length of light sources 8 and 8'. A deflecting mirror 11, from which the light is deflected onto a second beam splitter 12, is also arranged in the arm of modulation interferometer 2 that has first partial beam 16, downstream from acoustical-optical modulator 9. The two partial beams 16, 17 are superimposed in second beam splitter 12 and injected into one or two monomode optical fiber arrangement(s). Due to the optical path difference produced by time delay element 10, the two partial beams 16, 17 do not interfere with one another. The light is guided via optical fiber arrangement 6 to measuring probe 3 and via additional optical fiber arrangement 7 to reference probe 5 and is ejected there. Measuring probe 3 and reference probe 5 are designed as a Michelson or Mirau interferometer, for example, so that the optical path difference of the superimposed beams of a measuring arm 3.1 and reference arm 3.2 of measuring probe 3, and a reference probe reference arm 5.1 andreference probe measuring arm 5.2 corresponds to the optical path difference of the two partial beams 16, 17 of modulation interferometer 2. The FIGURE shows measuring probe 3 and reference probe 5 as a Michelson interferometer.

The measuring beam traveling through measuring arm 3.1 is focused by an optical arrangement onto the surface of measuring object 4 to be measured. The light reflected from the surface is superimposed on the reference beam returning in reference arm 3.2 to a reflecting element and injected into an optical fiber leading to beam splitting and receiving unit 13. Due to the path difference compensation, the light beams may interfere with one another. Accordingly, the light of reference probe measuring arm 5.1 is superimposed by the light of reference probe reference arm 5.2 and sent to second beam splitting and receiving unit 13' via second optical fiber arrangement 7 through an appropriate outgoing arm of second optical fiber arrangement 7.

Due to the path difference compensation in measuring probe 3 and reference probe 5, the light beams may interfere with one another. The light phase difference, which is made easy to analyze using the heterodyne method in conjunction with the acoustical-optical modulators, contains information about the distance of the surface to be measured of measuring object 4 and thus about its surface structure. The light returned from measuring probe 3 and reference probe 5 into modulation interferometer 2 is ejected from optical fiber arrangement 6 and additional optical fiber arrangement 7, decomposed into a plurality of colors, i.e., wavelengths with the help of a spectral element (for example, grating or prism) of beam splitting and receiving unit 13 and additional beam splitting and receiving unit 13' and focused onto the photodetector matrix. Each photodetector delivers an electrical signal that has the differential frequency generated by acoustical-optical modulators 9,9' and phase $\phi_n$, which with the surface structure and distance to the measuring object is related to the measured quantity $\Delta L$ (shape deviation, roughness) and the respective wavelength $\lambda_n$ according to the equation $$\phi_n = (2\pi\lambda_n)\Delta L \cdot 2$$

Evaluation is performed on the basis of forming the difference between the phases of the signals coming from the different photodetectors.

By measuring the phase differences of the signals from a plurality of photodetectors (multiwavelength heterodyne interferometry, see the above-mentioned document for more information) the measured quantity $\Delta L$, which may be greater than individual light wavelengths, can be unambiguously determined in an analyzer, for example, in the form of a computer 14.

With the interferometric measuring device 1 according to the exemplary embodiment of the present invention, advantageous separation into a section that has easy-to-handle measuring probe 3 and reference probe 5 and a section that has the relatively sensitive components of modulation interferomfteter 2 and analyzer, is achieved. Short time coherent, broad-band light sources 8 and 8' allow a plurality of stable beam components of different wavelengths to be provided easily and shape deviations, which may be as high as a multiple of the wavelength to be unambiguously evaluated in an improved manner.

What is claimed is:

1. An interferometric measuring device for detecting one of a shape and a distance of a rough surface, the measuring device comprising:

at least one spatially coherent beam gun unit for emitting a short time coherent broad-band beam;

a first beam splitter for splitting the short time coherent broad band beam into a first partial beam and a second partial beam;

a first device for one of modulating a phase of the first partial beam with respect to a phase of the second partial beam, and for shifting a frequency of the fist partial beam with respect to a frequency of the second partial beam by a heterodyne frequency;

a time delay element arranged in a beam path of one of the first partial beam and the second partial beam for producing a difference of optical path lengths of the first and second partial beams, the difference being greater than a coherence length of the beam emitted by the at least one spatially coherent beam gun unit, the first partial beam and the second partial beam being superimposed on one another to form a first superimposed beam;

a measuring probe for dividing the first superimposed beam into a reference beam and a measuring beam, the measuring probe including a reference arm for guiding and reflecting the reference beam therein, and a measuring arm for guiding and reflecting the measuring beam onto the rough surface, wherein the measuring probe compensates for the difference of optical path lengths so that the measuring beam in the measuring arm and the reference beam in the reference arm are able to interfere with one another;

a superimposing unit for superimposing the reflected measuring beam on the reflected reference beam;

a beam splitting and receiving unit for splitting the superimposed beam into at least two beams having different wavelengths and for converting the at least two beams into electrical signals;

an analyzer for determining the one of the shape and the distance of the rough surface as a function of a phase difference of the electrical signals; and a remote unit separate from the measuring probe, wherein the at least one spatially coherent beam gun unit, the first beam splitter, and the first device are arranged in the remote unit.

2. The measuring device according to claim 1, wherein the remote unit is a modulation interferometer.

3. The measuring device according to claim 1, wherein the at least one spatially coherent beam gun unit includes a light source for emitting the short time coherent broad-band beam.

4. The measuring device according to claim 1, further comprising:

an optical fiber arrangement for coupling the remote unit and the measuring probe to one another.

5. The measuring device according to claim 1, wherein the remote unit further includes a second beam splitter that receives the first partial beam and the second partial beam, the first partial beam and the second partial beam being superimposed on one another at the second beam splitter, the second beam splitter forwarding the superimposed beam to the measuring probe.

6. The measuring device according to claim 3, wherein the at least one spatially coherent beam gun unit includes a second light source, the second light source having a short time coherence and being broad-band and spatially coherent, the second light source being operable one of for light amplification and as a backup light source.

7. The measuring device according to claim 1, further comprising:

a second device for frequency shifting the first partial beam with respect to the second partial beam, the second device being arranged in the beam path of one of the first partial beam and the second partial beam, the first device and the second device being acoustical-optical modulators.

8. The measuring device according to claim 4, wherein:

the beam splitting and receiving unit includes a spectral device and a downstream photo-detector matrix, the spectral device splitting the superimposed beam into a plurality of wavelengths, the downstream photo-detector matrix selectively receiving the plurality of wave lengths;

the beam splitting and receiving unit is mounted in the remote unit;

the beam splitting and receiving unit is coupled to the measuring probe via the optical fiber arrangement; and phase differences of signals from individual detectors of the photo-detector matrix are used for determining the one of the shape and the distance of the rough surface.

9. The measuring device according to claim 1, wherein:

the measuring probe has a beam splitter, the measuring probe being one of a Michelson interferometer and a Mirau interferometer; and an optical path difference provided by the measuring arm and the reference arm compensates for the difference in optical path lengths produced by the time delay element.

10. The measuring device according to claim 4, further comprising:
 a second beam splitting and receiving unit arranged in the remote unit; and
 a reference probe having a reference arm and a measuring arm, the reference probe being coupled to the remote unit via a second optical fiber arrangement, a second beam path being formed from the second beam splitter to the reference probe.

11. The measuring device according to claim 1, wherein the measuring device is used for measuring an internal geometry of a borehole.

* * * * *

UNITED STATES PATENT AND TRADEMARK OFFICE
CERTIFICATE OF CORRECTION

PATENT NO. : 6,724,485 B1
DATED : April 20, 2004
INVENTOR(S) : Pawel Drabarek

It is certified that error appears in the above-identified patent and that said Letters Patent is hereby corrected as shown below:

Column 4,
Line 5, change "a first beam splitter is," to -- a first beam splitter 18, --
Line 9, change "Roth partial beams" to -- Both partial beams --
Line 36, change "andrefer." to -- and refer. --

Column 6,
Line 51, change "wave lengths;" to -- wavelengths; --

Signed and Sealed this

Nineteenth Day of April, 2005

JON W. DUDAS
*Director of the United States Patent and Trademark Office*